(12) United States Patent
Wu et al.

(10) Patent No.: US 7,936,513 B2
(45) Date of Patent: May 3, 2011

(54) DIFFRACTION GRATING RECORDING MEDIUM

(75) Inventors: Mao-Jen Wu, Kaohsiung (TW); Jian-Shian Lin, Yilan County (TW); Chih-Chieh Su, Taichung County (TW); Che-Lung Hsu, Taipei (TW); Zong-Ru Tu, Keelung (TW); Jenq-Yang Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 660 days.

(21) Appl. No.: 11/947,792

(22) Filed: Nov. 30, 2007

(65) Prior Publication Data

US 2009/0009868 A1    Jan. 8, 2009

(30) Foreign Application Priority Data

Jul. 3, 2007    (TW) ................................ 96124116 A

(51) Int. Cl.
G02B 5/18    (2006.01)
(52) U.S. Cl. ...................................................... 359/569
(58) Field of Classification Search ................... 359/569
See application file for complete search history.

(56) References Cited

U.S. PATENT DOCUMENTS

| 5,912,767 | A | 6/1999 | Lee |
| 2006/0193550 | A1* | 8/2006 | Wawro et al. ................ 385/12 |
| 2008/0138013 | A1* | 6/2008 | Parriaux .......................... 385/37 |

FOREIGN PATENT DOCUMENTS

| JP | 8021909 | 1/1996 |
| TW | 200606890 | 2/2006 |
| WO | WO 2005/103771 | * 11/2005 |

OTHER PUBLICATIONS

"Office Action of Taiwan Counterpart Application", issued on Jan. 28, 2011, p1-p4, in which the listed reference was cited.

* cited by examiner

*Primary Examiner* — Joshua L Pritchett
(74) *Attorney, Agent, or Firm* — Jianq Chyun IP Office

(57) ABSTRACT

A diffraction grating recording medium including a waveguide layer and a grating structure layer is provided. The waveguide layer has a reflective surface and a light incident surface, in which a thickness of the waveguide layer is between 100 nanometers and 2 micrometers, and the reflective surface reflects a light that enters the waveguide layer from the light incident layer. The grating structure layer is disposed on the light incident surface of the waveguide layer, in which the grating structure layer has a plurality of diffractive elements, and the arranging period of the diffractive elements is between 50 nanometers and 900 nanometers.

12 Claims, 5 Drawing Sheets

DIFFRACTION GRATING RECORDING MEDIUM

CROSS-REFERENCE TO RELATED APPLICATION

This application claims the priority benefit of Taiwan application serial no. 96124116, filed on Jul. 3, 2007. All disclosure of the Taiwan application is incorporated herein by reference.

BACKGROUND OF THE INVENTION

1. Field of the Invention

The present invention relates to a diffraction grating recording medium. More particularly, the present invention relates to a diffraction grating recording medium with high recognition degree and high difficulty in forging.

2. Description of Related Art

Credit cards, cashes, checks, and other important files need to have a feature of being not easy to be duplicated. However, the recent duplicating equipment and duplicating technique become increasingly developed, so it is also necessary to develop an updated anti-forgery technique. Hologram is a diffractive optical element, and is widely applied in authentication, security, anti-forgery, and other purposes, such as holographic pigeon pattern or holographic globe pattern on the credit cards. The main reason is that it is impossible to forge the hologram by means of scanning or printing, and it is not easy to forge in a holographic manner except for the experts familiar with the holographic technique. The diffraction grating recording medium has an advantage of being suitable for mass production, so it is usually applied in holographic anti-forgery technique.

FIG. 1 is a schematic view of a conventional diffraction grating recording medium. Referring to FIG. 1, a diffraction grating recording medium 100 has a substrate 110, and the substrate 110 is divided into a plurality of regions 120 including a region 120a to a region 120e. Each region 120 has an adhesion layer 130 and a plurality of diffractive elements 140, and the adhesion layer 130 fixes the diffractive elements 140 on the substrate 110. The diffractive elements 140 in each region 120 are arranged with different patterns, so that the regions 120 can display different colors and generate a holographic image.

FIG. 2A is a schematic view of diffraction gratings of different colors of another conventional diffraction grating recording medium, and FIG. 2B is a schematic view of the disposition of diffraction gratings in FIG. 2A. Referring to FIGS. 2A and 2B, diffraction gratings 210 in FIG. 2A include red diffraction gratings $R_0$-$R_{255}$, green diffraction gratings $G_0$-$G_{255}$, and blue diffraction gratings $B_0$-$B_{255}$, capable of generating primary color with different intensities, respectively. Different diffraction gratings 210 are chosen to provide different colors. A holographic pixel 200 in FIG. 2B includes a plurality of mixed diffraction gratings 210, so as to provide required colors.

In the holographic pixel 200, the diffraction gratings 210 are conventional straight line gratings, such that the colors can only be adjusted by adjusting pitch of grating, so it is difficult to increase viewing angle of the holographic pixel 200.

SUMMARY OF THE INVENTION

Accordingly, the present invention is directed to provide a diffraction grating recording medium with a wide viewing angle.

The present invention provides a diffraction grating recording medium, which includes a waveguide layer and a grating structure layer. The waveguide layer has a reflective surface and a light incident surface, in which a thickness of the waveguide layer is between 100 nanometers and 2 micrometers, and the reflective surface reflects a light entering the waveguide layer from the light incident surface. The grating structure layer is disposed on the light incident surface of the waveguide layer, in which the grating structure layer has a plurality of diffractive elements, and an arranging period of the diffractive elements is between 50 nanometers and 900 nanometers.

In view of the above, the present invention has a waveguide layer, so the brightness of the diffraction grating recording medium and the viewing angle of the light with a single wavelength are increased by matching the grating structure layer with the waveguide layer. In addition, the grating structure layer is directly formed on the waveguide layer, so it is not easy for the grating structure to fall off. In addition, the diffractive elements can have a plurality of different shapes, and can be arranged with different arranging periods, so as to further reduce color shift of the diffraction grating recording medium, and to improve color saturation.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
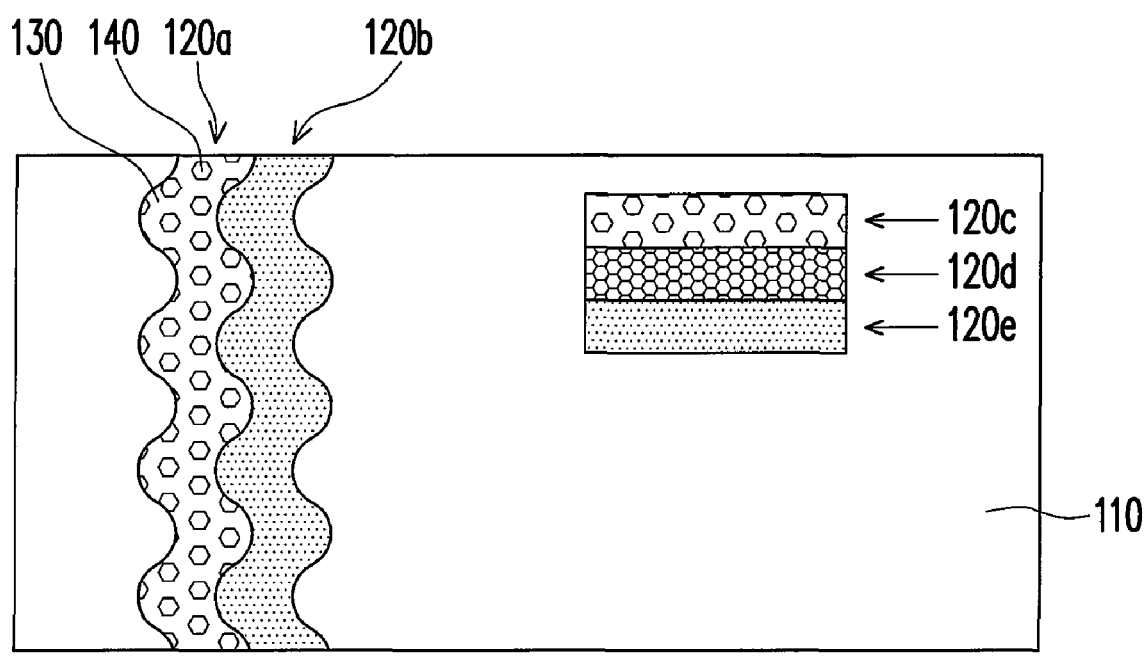
FIG. 1 is a schematic view of a conventional diffraction grating recording medium.
Figure 2A:
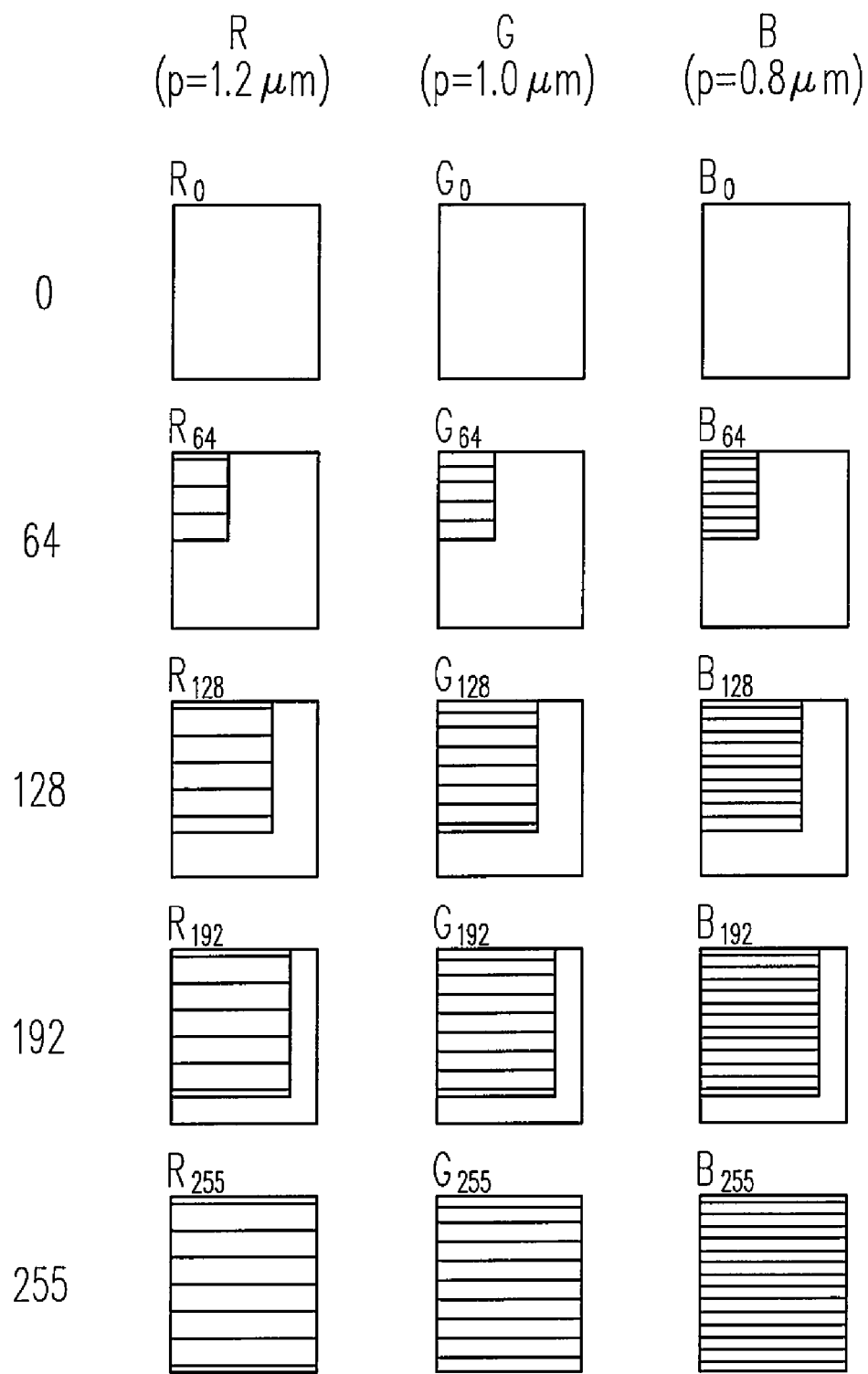
FIG. 2A is a schematic view of diffraction gratings of different colors of another conventional diffraction grating recording medium.
Figure 2B:
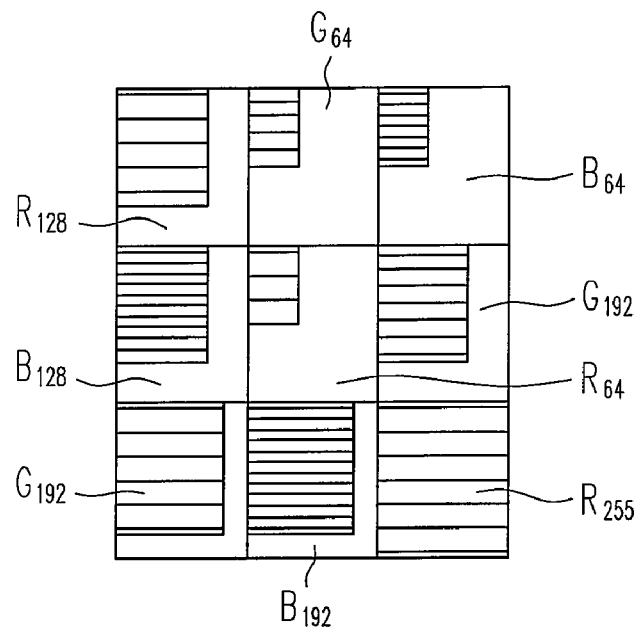
FIG. 2B is a schematic view of the disposition of diffraction gratings in FIG. 2A.
Figure 3:
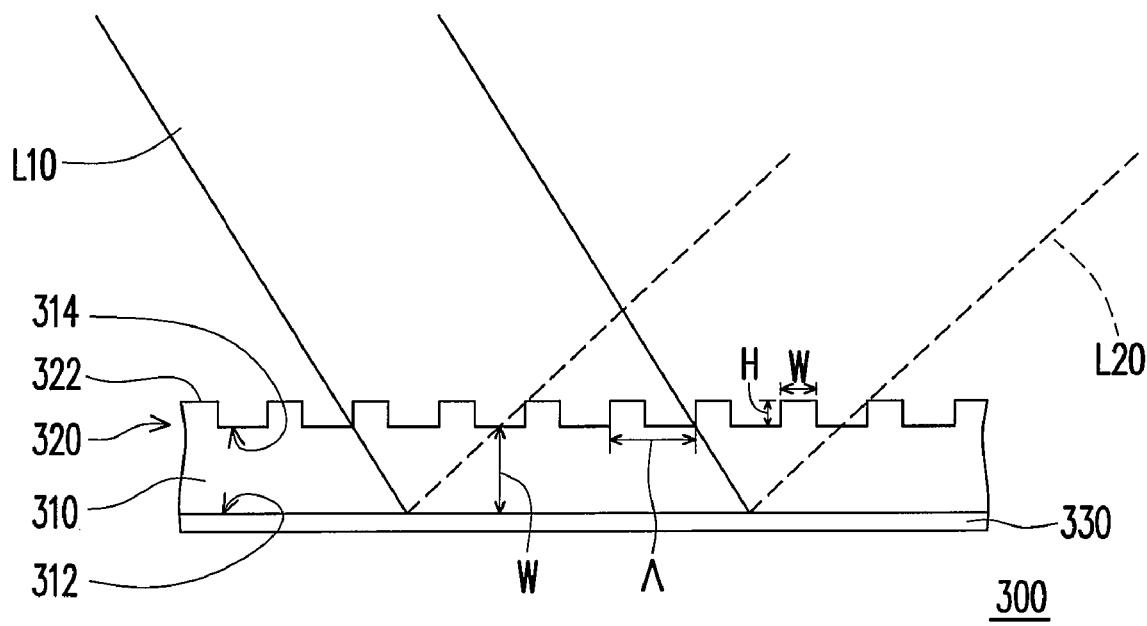
FIG. 3 is a cross-sectional view of a diffraction grating recording medium according to an embodiment of the present invention.

FIG. 3 is a cross-sectional view of a diffraction grating recording medium according to an embodiment of the present invention. Referring to FIG. 3, a diffraction grating recording medium 300 includes a waveguide layer 310 and a grating structure layer 320. The waveguide layer 310 has a reflective surface 312 and a light incident surface 314, the grating structure layer 320 has a plurality of diffractive elements 322, and the grating structure layer 320 is disposed on the light incident surface 314 of the waveguide layer 310. A light L10 is incident from the light incident surface 314, enters the waveguide layer 310 through the grating structure layer 320, is reflected by the reflective surface 312 of the waveguide layer 310, and exits from the light incident surface 314, so as to form a holographic light beam L20. A thickness of the waveguide layer 310 is between 100 nanometers and 2 micrometers, and an arranging period of the diffractive elements 322 is between 50 nanometers and 900 nanometers. The thickness of the waveguide layer 310 and the arranging period of the diffractive elements 322 may be properly adjusted to make the diffraction grating recording medium 300 have wider viewing angle.

For example, a height H of the diffractive element is 0.4 micrometers, a width W thereof is 2.32 micrometers, an arranging period $\Lambda$ thereof is 0.58 micrometers, and a thickness T of the waveguide layer is 0.1 micrometers. In this manner, when a light with a wavelength of about 629.5 nanometers is used to irradiate the diffraction grating recording medium 300, the viewing angle is up to 10 degrees. In addition, in this embodiment, the waveguide layer 310 and the grating structure layer 320 is made of the same material, for example silicon nitride, and a refractive index of the waveguide layer 310 is 2.0.

In addition, the diffraction grating recording medium 300 may further include a reflective material layer 330. The material of the reflective material layer 330 is, for example, aluminum, and the reflective material layer is disposed under the reflective surface 312 of the waveguide layer 310. The reflective material layer 330 can enhance the reflection of the waveguide layer 310 on the light L10.

Figure 4A:
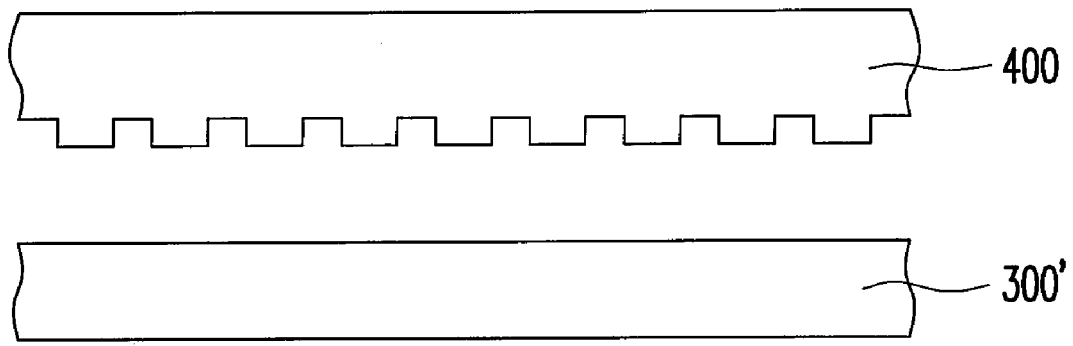
FIGS. 4A and 4B are cross-sectional views of fabricating flow of the diffraction grating recording medium in FIG. 3.
Figure 4B:
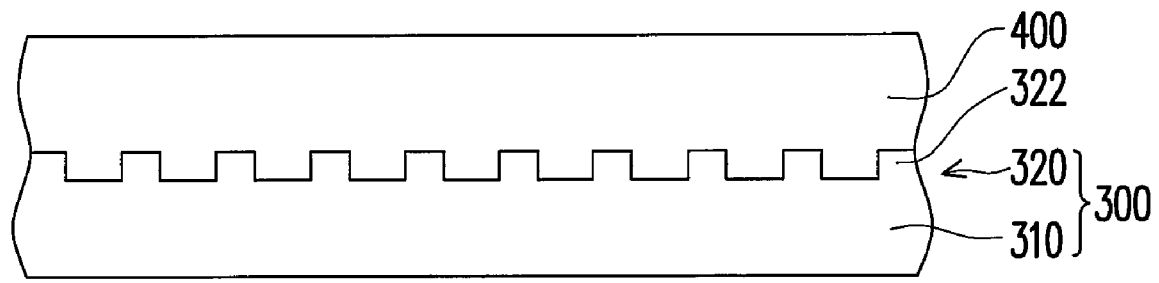

FIGS. 4A and 4B are cross-sectional views of fabricating flow of the diffraction grating recording medium in FIG. 3. Referring to FIGS. 4A and 4B, the grating structure layer 320 and the waveguide layer 310 may be made of the same material, and the material is, for example, thermoplastic material or UV-curable material (e.g. UV-curable polymer), and the refractive index thereof can be between 1.4 and 1.6. The user can generate the holographic image to be record in a digitalized format, for example digitalized red, green, and blue (RGB) format or hue, saturation, and brightness (HSB) format. A mold 400 is fabricated by an electron beam etching manner, and the mold 400 is used to perform embossing on a base material 300' to form the grating structure layer 320 and the waveguide layer 310.

The diffraction grating recording medium 300 has a waveguide layer 310, and the thickness of the waveguide layer 310 is match with the arranging period of the diffractive elements 322, so as to enhance the brightness of the diffraction grating recording medium 300 and the viewing angle of the light with single wavelength. In addition, the grating structure layer 320 can be directly formed on the waveguide layer 310, such that it is not easy for the grating structure layer 320 to fall off. In addition, the diffractive elements 322 may have a plurality of different shapes, and may be arranged with a plurality of arranging periods, so as to further reduce the color shift of the diffraction rating recording medium 300 and enhance the color saturation.

Figure 5:
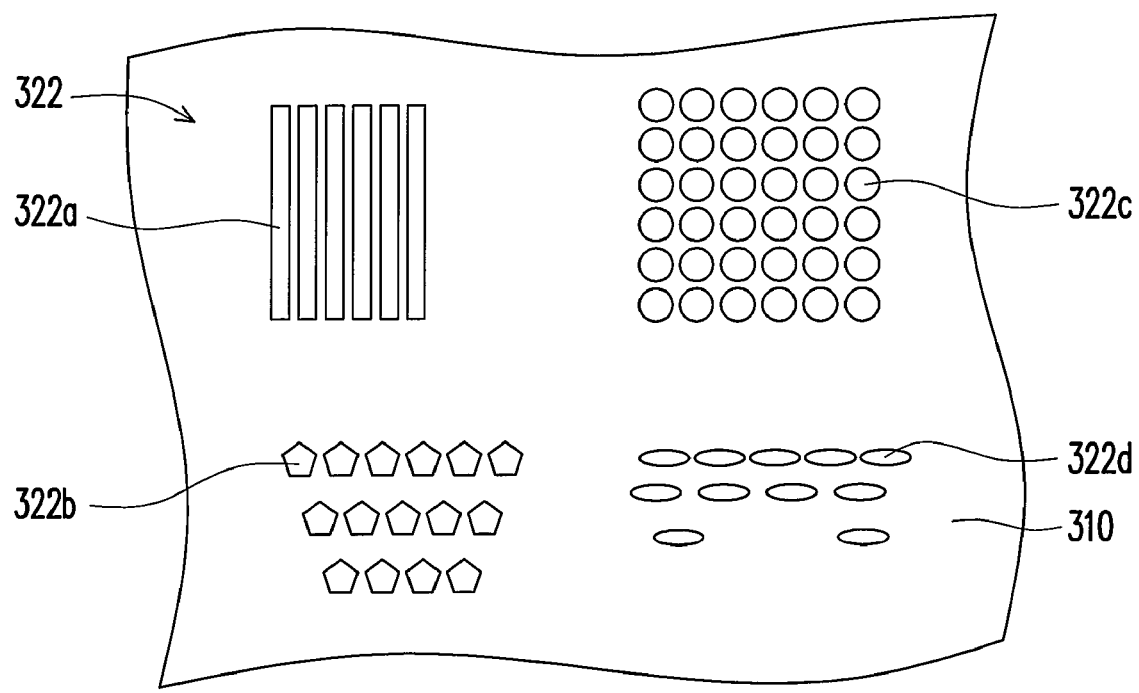
FIG. 5 is a schematic view of the arrangement of the diffractive elements of the diffraction grating recording medium in FIG. 3.

FIG. 5 is a schematic view of the arrangement of the diffractive elements of the diffraction grating recording medium in FIG. 3. Referring to FIG. 5, in this embodiment, the diffractive elements 322 include a diffractive element 322a, a diffractive element 322b, a diffractive element 322c, and a diffractive element 322d. The diffractive elements 322 have different shapes, for example, strip structure (the diffractive element 322a) or columnar structure, in which the columnar structure is, for example, polygonal columnar structure (the diffractive element 322b), cylindrical structure (the diffractive element 322c), or elliptic columnar structure (the diffractive element 322d). In addition, the diffractive elements 322 may be arranged with a single period, or can be arranged with a plurality of periods.

The diffraction grating recording medium of the present invention has a waveguide layer, and the thickness of the waveguide layer matches with the arranging period of the diffractive elements, so as to increase the brightness of the diffraction grating recording medium and the viewing angle of the light with single wavelength.

The grating structure layer in an embodiment of the present invention is directly formed on the waveguide layer, such that it is not easy for the grating structure layer to fall off.

The diffractive elements in an embodiment of the present invention have a plurality of difference shapes, and can be arranged with a plurality of arranging periods, so as to further reduce color shift of the diffraction grating recording medium, and to improve color saturation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A diffraction grating recording medium, comprising:
a waveguide layer, having a reflective surface and a light incident surface, wherein a thickness of the waveguide layer is between 100 nanometers and 2 micrometers, and the reflective surface reflects a light entering the waveguide layer from the light incident surface; and
a grating structure layer, disposed on the light incident surface of the waveguide layer, wherein the grating structure layer has a plurality of diffractive elements, and an arranging period of the diffractive elements is between 50 nanometers and 900 nanometers, wherein the diffractive elements have a width of 2.32 micrometers, a height of 0.4 micrometers, an arranging period of 0.58 micrometers, and the waveguide layer has a thickness of 0.1 micrometers.

2. The diffraction grating recording medium as claimed in claim 1, wherein a material of the waveguide layer is the same as a material of the grating structure layer.

3. The diffraction grating recording medium as claimed in claim 2, wherein a material of the waveguide layer and the grating structure layer comprises thermoplastic material.

4. The diffraction grating recording medium as claimed in claim 2, wherein a material of the waveguide layer and the grating structure layer comprises UV-curable polymer.

5. The diffraction grating recording medium as claimed in claim 2, wherein a refractive index of the waveguide layer is between 1.4 and 1.6.

6. The diffraction grating recording medium as claimed in claim 2, wherein a material of the waveguide layer and the grating structure layer comprises silicon nitride.

7. The diffraction grating recording medium as claimed in claim 6, wherein a refractive index of the waveguide layer is 2.0.

8. The diffraction grating recording medium as claimed in claim 1, wherein the diffractive elements comprise strip structure or columnar structure.

9. The diffraction grating recording medium as claimed in claim 8, wherein the columnar structure comprises a polygonal columnar structure, a cylindrical structure, or an elliptic columnar structure.

10. The diffraction grating recording medium as claimed in claim 1, wherein the diffractive elements are arranged with a single arranging period.

11. The diffraction grating recording medium as claimed in claim 1, wherein the diffractive elements are arranged with a plurality of arranging periods.

12. The diffraction grating recording medium as claimed in claim 1, further comprising a reflective material layer disposed on the light reflective surface of the waveguide layer.

* * * * *